Patented Feb. 8, 1927.

1,617,255

UNITED STATES PATENT OFFICE.

IB HENRY HOLM JACOBSEN, OF GEDVED, NEAR HORSENS, DENMARK.

FUNGICIDE.

No Drawing. Application filed April 15, 1926, Serial No. 102,309, and in Germany, Sweden, and Norway July 31, 1925.

The present invention relates to the treatment of growing plants. The object of the invention is to provide means for the suppression of fungoid growths on plants, said means taking the form of a homogeneous pulverized material which can be readily applied to the plants and is incapable of causing damage to them.

For the purpose of suppressing fungoid growths on plants such as potatoes the so-called Bordeaux mixture, i. e., a copper-calcium solution prepared by mixing copper sulphate and lime water, is generally employed.

The application of spraying preparations is, however, rather laborious, and attempts have therefore been made to replace these preparations by pulverized materials having the properties of the Bordeaux mixture for instance powdered copper sulphate alone has been simply strewn over the plants. This may, however, act detrimentally on the plants and, besides this, disproportionately large quantities of copper sulphate have to be used for this method. In consequence of this the expedient of mixing fillers, for example, kaolin and gypsum, with the copper sulphate has been tried.

It has been found however, that such mechanical mixtures of pulverized copper sulphate and fillers—if they are to act at all against the attacks of fungoid growths—have to contain such a high percentage of copper sulphate that the powder damages the plants as well, since the individual particles of copper sulphate act as a caustic on the stems and leaves.

According to the invention a powder is provided the use of which eliminates these drawbacks owing to the fact that it is not a mixture, but is made up of absolutely similar particles consisting of a comparatively neutral filler "impregnated" with copper sulphate or other suitable fungus-preventing or fungicidal substance. In this powder there are no free particles of copper sulphate or the like, and the powder consequently cannot in use exercise any caustic action on the plants.

The powder consists of copper sulphate or other suitable fungus-preventing or fungicidal substance and gypsum, to which if necessary the requisite quantity of lime or other basic bodies for neutralization purposes may be added.

If a solution of copper sulphate be added to burnt gypsum, the gypsum takes up its water of crystallization and becomes at the same time "impregnated" with copper sulphate. If, afterwards, the gypsum, which will then have set, be pulverized, a powder is obtained, the individual granules of which contain copper sulphate.

Now it has been found that even when the strongest possible solution of copper sulphate is used, a powder prepared in this way is comparatively weak and has but little action on fungoid growths.

In order to obtain a powder of the necessary copper sulphate strength, according to the invention the act of going into solution of the copper sulphate and the act of taking up the water of crystallization by the gypsum are arranged to take place simultaneously in one operation. The following is one example of a suitable method of preparing a powder according to the invention:

7–8 parts of pulverized copper sulphate are mixed with 100 parts of gypsum and the requisite quantity of lime for neutralization and water is added. A considerable development of heat is caused, during which the gypsum takes up its water of crystallization whilst the pulverized copper sulphate simultaneously goes into solution during the heating process and "impregnates" the gypsum. When the gypsum has set, it is then pulverized in known manner.

In this way a powder can be prepared which is absolutely homogeneous and which contains the necessary quantity of copper sulphate.

It is, of course, understood that in place of pure water a copper sulphate solution may be added to the mixture of pulverized copper sulphate and gypsum.

I claim:

1. Process for the preparation of a homogeneous powder for the suppression of fungoid growths, comprising in combination: making a mixture of a pulverized fungicidal substance with pulverized burnt gypsum, adding water to said mixture so that heat is developed and said substance goes into solution, allowing said mixture with said added water to cool down whereby it sets to a solid mass, and pulverizing said solid mass, substantially as described.

2. Process for the preparation of a homogeneous powder for the suppression of fungoid growths on plants, comprising in combination: making a mixture of pulverized copper sulphate with pulverized burnt gypsum and the necessary quantity of basic substance for neutralization, adding water to said mixture, allowing said mixture with said added water to set to a solid mass, and pulverizing said solid mass, substantially as described.

3. Process for the preparation of a homogeneous powder for the suppression of fungoid growths on plants, comprising in combination: preparing a mixture of pulverized copper sulphate, pulverized burnt gypsum and the necessary quantity of lime for neutralization; adding water to said mixture so that heat is developed and said copper sulphate goes into solution whilst said gypsum simultaneously takes up its water of crystallization; allowing said mixture with said added water to cool down and so set to a solid mass; and pulverizing said solid mass, substantially as described.

4. Process for the preparation of a homogeneous powder for the suppression of fungoid growths on plants, comprising in combination: making a mixture of pulverized copper sulphate with pulverized burnt gypsum and the necessary quantity of basic substance for neutralization, adding a solution of copper sulphate to said mixture, allowing said mixture to set to a solid mass, and pulverizing said solid mass, substantially as described.

In testimony whereof I have hereunto set my hand.

IB HENRY HOLM JACOBSEN.